(No Model.)

J. W. BUTTS.
TWO WHEELED VEHICLE.

No. 386,107. Patented July 17, 1888.

Witnesses:
James Apted
Chas. A. Howe.

J. Wesley Butts.
Inventor.

N. PETERS, Photo-Lithographer, Washington, D. C.

UNITED STATES PATENT OFFICE.

J. WESLEY BUTTS, OF MILTON, CASS COUNTY, MICHIGAN.

TWO-WHEELED VEHICLE.

SPECIFICATION forming part of Letters Patent No. 386,107, dated July 17, 1888.

Application filed August 22, 1887. Serial No. 247,628. (No model.)

*To all whom it may concern:*

Be it known that I, J. WESLEY BUTTS, a citizen of the United States, residing in Milton township, county of Cass, and State of Michigan, have invented certain new and useful Improvements in Two-Wheeled Vehicle Spring and Attachments; and I do hereby declare the following to be a full, clear, and exact description of the same, reference being had to the acompanying drawings, and to the letters of reference marked thereon.

The object of my invention is to construct a cheap, desirable, and efficient vehicle-spring and attachments to the vehicle-thills so arranged as to overcome the side as well as the forward and backward motion of the horse to the rider. I attain this result by the use of a semi-elliptic spring and attachments fastened to the under side of the thills, as follows: One end of the spring is held in position to the thills with a link attachment. The opposite end is secured to the seat-frame with a clip having a member extending through the spring-surface that allows it to turn edgewise when held on the post with suitable fastenings. Fastened to the thills and extending downward, inclosing the spring, is the hanger, notched so as to act as a fulcrum and guide to the spring, that may be raised or lowered by shifting the cross-bar connected to the spring by an eye from one notch to another. The spring is made with a slot, so when desirable a bolt can be used through the hanger to fix the height of seat without making the spring inoperative.

Figure 1:
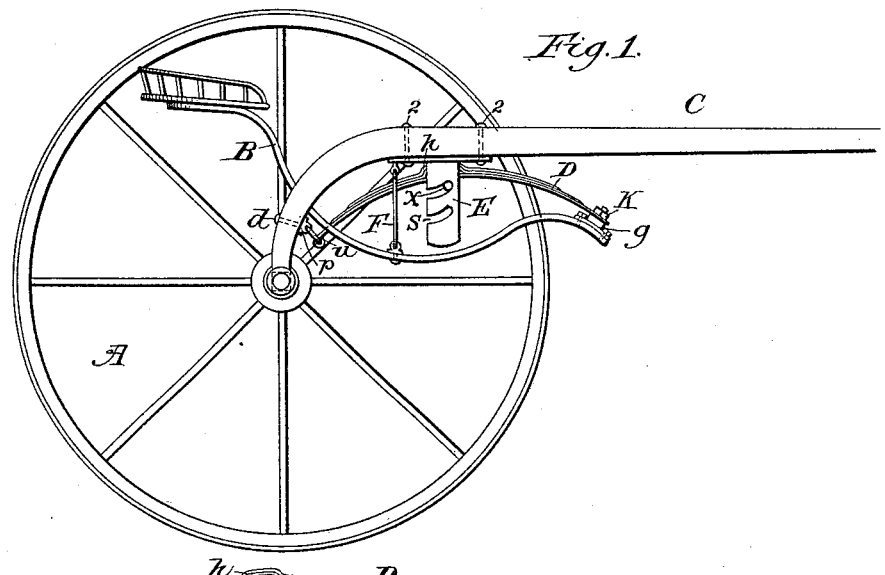
Figure 2:
Figure 3:
Figure 4:
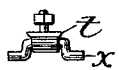
Figure 5:
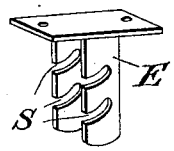

In the drawings forming a part of this specification, Figure 1 is a detailed side view showing my invention attached to vehicle. Fig. 2 is a detailed side view of spring and check-pin attached; Fig. 3, a side view of connecting-clip with extending member. Fig. 4 is a side view of check-pin and eye. Fig. 5 is a side perspective view of hanger.

In the drawings, A is the wheel; B, the seat-frame; C, the thill, which needs no special description.

The spring D is fastened to the thill C at the lower end by means of the link U, passing through the eye P, which gives it a chance to move forward and backward; also, fastened to the thill C with bolts 2 2 is the hanger E, with notches to receive the check-pin X, that is free to turn in the eye $t$, fastened in center spring, D, and located in the hanger, so as to act as a fulcrum to make the spring operative. Fastened at the end of seat-bar is the clip, Fig. 3, with a member extending through a hole in the surface of spring D at the end in such a manner as to allow the spring to turn on the bolt edgewise, so if the seat moves sidewise it will turn on the post or member held by nut K; also, fastened to the thill is the rod F, fastened to the seat-frame with a common eye to form a connection and support the seat. The elevation of seat is changed by raising the seat-frame, which relieves the upward strain on check-pin and allows it to be placed in any slot in the hanger desirable, and retained thereby by the seat and frame.

The slot in the spring is only operative up or down, but is free to work endwise, leaving the efficiency of spring the same as with the coupling shown, and need not be detailed.

Having thus fully described my invention, what I deem as new, and wish to secure by Letters Patent, is—

1. In a two-wheeled vehicle and attachments, a hanger with slots S to receive the check-pin X, acting as a fulcrum to spring D by being connected thereto with eyebolt $t$, as above described, and for the purpose specified.

2. In a two-wheeled-vehicle spring attachment, a slot in the spring, in combination with the hanger E, slot S, check-pin X, connection-rod $t$, link U, thill C, and seat-frame B, as described, and for the purpose specified.

3. In a two-wheeled-vehicle spring and attachments, the connecting-clamp $g$, with extending member or post passing through hole in the spring near the end and held by a nut, substantially as described, and for the purpose specified.

4. In a two-wheeled-vehicle spring and attachments, a link coupled to the spring and thill to allow the spring a forward and backward motion, in combination with the hanger E, spring D, connecting-clip $g$, connecting-rod $t$, and seat-frame B, as above described, and for the purpose specified.

In witness whereof I have hereunto set my hand, at Niles, Michigan, this 18th day August, A. D. 1887.

J. WESLEY BUTTS.

In presence of—
   CHAS. S. HOWE,
   JAMES APTED.